(12) United States Patent
Matsuo et al.

(10) Patent No.: US 6,609,048 B2
(45) Date of Patent: Aug. 19, 2003

(54) POWER AMOUNT CONTROL METHOD

(75) Inventors: Satoko Matsuo, Tokyo (JP); Tadaaki Sakamoto, Tokyo (JP); Naotaka Terashita, Tokyo (JP); Yoshihiko Ozaki, Tokyo (JP); Tadashi Ohi, Tokyo (JP); Kenji Hirai, Tokyo (JP); Takashi Nakagawa, Tokyo (JP); Makoto Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 118 days.

(21) Appl. No.: 09/874,362

(22) Filed: Jun. 6, 2001

(65) Prior Publication Data

US 2003/0045969 A1 Mar. 6, 2003

(30) Foreign Application Priority Data

Jun. 28, 2000 (JP) ........................................ 2000-194684

(51) Int. Cl.[7] .................................................. G05D 9/00
(52) U.S. Cl. ........................................ 700/291; 705/412
(58) Field of Search ................................ 700/291; 705/1, 705/412, 63

(56) References Cited

U.S. PATENT DOCUMENTS 4,218,737 A * 8/1980 Buscher et al. ............... 702/62
5,481,140 A * 1/1996 Maruyama et al. ............ 307/11
5,974,369 A * 10/1999 Radtke et al. ................ 702/199

FOREIGN PATENT DOCUMENTS

| JP | 7-143670 A | 6/1995 |
|----|-----------|--------|
| JP | 9-84146 A | 3/1997 |
| JP | 11-308771 | 11/1999 |

OTHER PUBLICATIONS

U.S. patent application Ser. No. 09/874,368, Matsuo et al., Jun. 6, 2001.

* cited by examiner

Primary Examiner—Leo Picard
Assistant Examiner—Alexander Kosowski
(74) Attorney, Agent, or Firm—Leydig, Voit & Mayer, Ltd.

(57) ABSTRACT

A power amount control method includes inputting for storage both a customer's contracted power amount and the customer's actually consumed power amount, visually displaying via network links a power amount difference between the contracted power amount and the consumed power amount, and obtaining such power amount difference between the contracted power amount and the consumed power amount for execution of either price setting of the contracted power amount or a contract breach process in accordance with the power amount difference.

1 Claim, 20 Drawing Sheets

1: SERVER COMPUTER
2: CLIENT COMPUTER (POWER PURCHASER SIDE)
3: CLIENT COMPUTER (POWER SUPPLIER SIDE)
4: NETWORK

FIG.3

| CUSTOMER NAMES | SALE CONTRACT TERM | ... | CONTRACT POWER AMOUNT | ALLOWABLE VARIATION AMOUNT | BONUS PROCESSING CONTENT | CONTRACT BREACH PROCESSING CONTENT |
|---|---|---|---|---|---|---|
| 1 | 1 month | ... | 0 A.M.–10A.M. : 30KW<br>10A.M.–5P.M. : 100KW<br>5P.M.–0A.M. : 30KW | 0 A.M.–10A.M. : ±10%<br>10A.M.–5P.M. : ±20%<br>5P.M.–0A.M. : ±10% | Cash Back | Power Stop |
| 2 | ... | ... | | ±20% | Cash Back | 10% Power Cut Enabled, Notice Required |
| 3 | ... | ... | | 0 A.M.–10A.M. : ±10KW<br>10A.M.–5P.M. : ±20KW<br>5P.M.–0A.M. : ±10KW | 10% Discount Upon Next Contract | Order to Pay Extra Charge |
| 4 | 15 days | ... | 100KW/h | ±10KW | 10% Discount Upon Next Contract | Power Stop with Extra Charge Payment Ordered |

FIG.4

| CUSTOMERS | 0–1 A.M. | 1–2A.M. | ... | 11A.M.–0P.M. | 0P.M.–1P.M. | ... |
|---|---|---|---|---|---|---|
| 1 | 10W | 10W | ... | 50W | | |
| 2 | 30W | 35W | ... | 80W | | |
| 3 | 10W | 10W | ... | 60W | | |
| 4 | 10W | 20W | ... | 70W | | |

FIG.6

CONTRACTED POWER AMOUNT INPUT DISPLAY

PLEASE INPUT POWER PATTERN

POWER CONSUMPTION PATTERN

[Bar chart: POWER vs TIME (0–24), with bars rising from hour 0 to hour 12]

[ 4 ] MONTH [ 10 ] DAY

[ 12 ] FROM [ ] O'CLOCK [ 2 / 4 ] FOR [ ] HOUR(S)       ( UPDATE )

[ 100 ] kW /h ( INPUT )    ( CANCEL )

FIG.9

CONTRACT BREACH PROCESSING SELECT DISPLAY

PLEASE SELECT YOUR PREFERRED PROCESSING UPON EXCESS OF ALLOWABLE VARIATION AMOUNT

<CONTRACT BREACH PROCESSING>

STOP POWER FEED
- ● WITH POWER CUT NOTICE
- ○ WITHOUT POWER CUT NOTICE

UPON EXCESS EVENTS, CUT POWER TO [ ]%,
EXTRA CHARGE ORDERED FOR EXCESSIVE POWER USE
- ○ WITH POWER CUT NOTICE
- ○ WITHOUT POWER CUT NOTIC

- ○ WITHOUT POWER CUT, WITH EXTRA CHARGE ORDERED (SELECT) (CANCEL)

201: DEMAND CONTROL DEVICE
202, 203, 204: IFU
205, 206: AIR CONDITIONER'S INDOOR MACHINES
209: WHOLE POWER METER
212, 213: AIR CONDITIONER'S OUTDOOR MACHINES

POWER AMOUNT CONTROL METHOD

BACKGROUND OF THE INVENTION

1. Field of the Invention

The present invention relates to a method and apparatus for controlling the amount of electric power used by more than one customer so that it stays at an appropriate level.

2. Description of the Related Art

Power plants for production of electric power are such that each station inherently has its own limit to the producible power amount depending upon the facility scale, while suffering from the lack of an ability to store a large amount of power. In view of these facts, an electric power manufacturing and selling party, i.e., power, dealer is generally required to supply adequate power to customers while precluding risks of unwanted concentration of customers' demands for excessive power greater than the limit at one time. Accordingly, in prior known power amount control methods, the power dealer has been expected to appropriately control power generation in such a way as to satisfy, for example, the presently established "save energy" doctrine by reducing customers' consumed power amounts or, alternatively, by suppressing power consumption in certain time zones of large amounts of consumed power on a per hour basis.

One example of such control methods of the type stated above is disclosed, for example, in Japanese Laid-Open Patent Publication Hei. 7-143670. With the scheme as taught by this Japanese Laid-Open Patent Publication, a power dealer controls loads by use of a demand control device for limiting the use of electric power in cases where the amount of power being consumed by a customer is going beyond his or her initially contracted power amount to thereby ensure that s/he does not use power in excess of the contracted power amount as shown in FIG. 20.

In addition, in order to avoid risks of power shortage otherwise occurring at a peak time of power consumption or to lighten loads as given to power generation facilities, the power dealer employs a unique charge collection system for promotion of time-shift utilization of electric power, which system permits energies stored by dedicated equipment at night—usually, less in power demands and low in power service prices—to be used in the day time with increased power demands while at the same time offering to customers several charge discount services including, but not limited to, a discount due to heat accumulation and/or an off-peak discount.

Although it is possible for the individual customer to control the power amount by introduction or installation of such demand control device and/or dedicated equipment, there is inherently no guarantee that the customer's power demands always stay below his or her contracted power amount. Actually, in some cases, an increased amount of power would be required at certain time points in excess of the contracted power amount. If this is the case, the customer is required to manage to get extra power compensating for such under power amount. This is achievable by requesting the customer's contracted power dealer to increase the power feed amount or, alternatively, by newly purchasing such required power from another power dealer. Note that in this case, the customer shall be accused of a breach of contract and then required to pay an additional charge as a penalty.

Prior art power amount control methodology is such that although appropriate control prevents the customer's consumed power amount from exceeding the customer's initially contracted power amount, such control is usually automatically carried out by the demand equipment or else so that the power consumption control per se is substantially entrusted to such demand equipment; thus, it will hardly occur that the customer performs this control task by himself or herself.

Additionally, since the customer per se will be aware of the exact amount of power being presently consumed merely by viewing an externally installed power meter such as an outdoor watt-meter, it is impossible or at least greatly difficult for the customer to readily know whether his or her consumed power amount actually exceeds the contracted power amount. Due to this inconvenience, there are problems as to waste power consumption and extra power purchasing activities.

Another problem is that in cases where the customer's power consumption amount is below his or her contracted power amount, the customer must pay an increased power charge, more than that for the actually used power amount in view of the fact that the customer has contracted for purchasing power from the power dealer. In addition, the power dealer also encounters difficulty in long-term storage of power once generated and thus is required to prepare necessary workers and fuel to provide the capability of generating at least the contracted amount of electric power irrespective of whether that power is actually consumed; accordingly, if the amount of actually consumed power is much less than the contracted power amount, part of preparation costs is wasted, resulting in a problem that both the customer and the power dealer experience cost/price disadvantages.

SUMMARY OF THE INVENTION

The present invention has been made to avoid the problems faced with the prior art, and a primary object of this invention is to provide an improved electric power amount control method and apparatus capable of facilitating power amount control while enabling more than one customer to readily obtain information as to a power amount difference between his or her contracted power amount and the amount of actually consumed power.

It is another object of the instant invention to provide a power amount control method and apparatus for successfully controlling the electric power amount while precluding that the power consumption amount of a customer is impermissibly less than his or her initially contracted power amount.

A power amount control method in accordance with the invention has the steps of: inputting and storing a customer's contracted power amount and an actually consumed power amount by the customer; displaying via a network information as to a power amount difference between the contracted power amount and the consumed power amount; and, executing either price setup of the contracted power amount or contract breach processing in accordance with said power amount difference according to the information.

With the power amount control method incorporating the principles of the invention, it is possible for more than one customer to promptly obtain, whenever the need arises, the information as to a power amount difference between his or her initially contracted power amount and the actually consumed power amount, thus enabling the customer to confirm whether electric power is being used in an appropriate way as expected by the contrast. Further, since through execution of either price setup of the contrasted power amount or contract breach processing in accordance with such power amount difference the individual customer attempts based on the information concerning the power amount difference thus obtained to perform power amount control so that his or her consumed power amount becomes at an adequate level, it is possible to well control the power consumption amount so that it stays at a suitable value.

In addition, a power amount control apparatus in accordance with the invention comprises of: means for inputting a contracted power amount and a consumed power amount; means for storing therein the contracted power amount and the consumed power amount as input by said input means; means for visually displaying via a network information as to a power amount difference between the contracted power amount and the consumed power amount; and, means for performing either price setup of the contracted power amount or contract breach processing in accordance with said power amount difference according to the information.

With the power amount control apparatus of the invention, it becomes possible for more than one customer to promptly obtain, whenever the need arises, the information as to a power amount difference between his or her initially contracted power amount and the actually consumed power amount, thus enabling the customer to confirm whether electric power is being used in an appropriate way as expected by the contrast. Further, since through execution of either price setup of the contrasted power amount or contract breach processing in accordance with such power amount difference the individual customer attempts based on the information concerning the power amount difference thus obtained to perform power amount control so that his or her consumed power is at an adequate level, it is possible to well control the power consumption amount so that it stays at a suitable value.

BRIEF DESCRIPTION OF THE DRAWINGS

FIG. 3 is a diagram showing sales contract information being stored in a storage means.

FIG. 4 is a diagram showing power use result information as stored in the storage means.

FIG. 6 is a diagram showing an on-screen display image for input of a contracted power pattern.

FIG. 9 is a diagram showing a contract breach processing select display.

DETAILED DESCRIPTION OF THE PREFERRED EMBODIMENTS

Embodiment 1.

Figure 1:
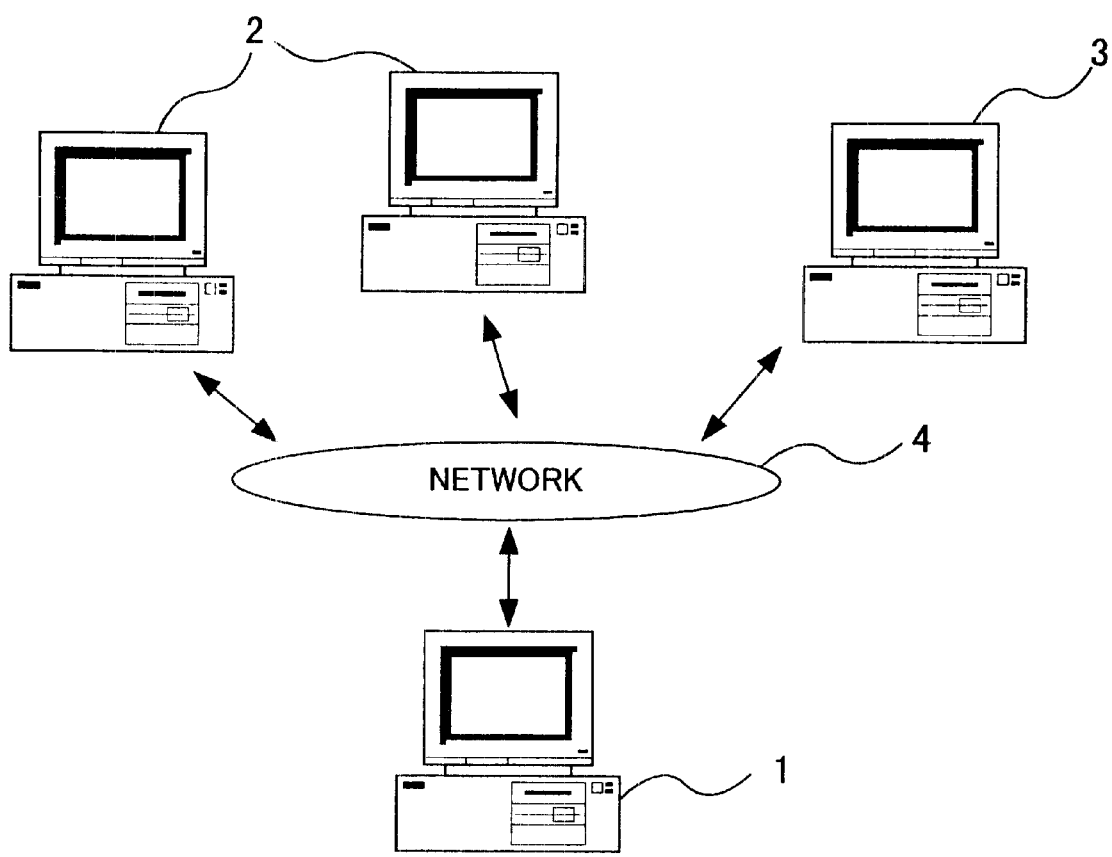
FIG. 1 is a diagram showing a configuration of a power amount control system in accordance with an embodiment 1 of the present invention.

FIG. 1 is a configuration diagram showing a power amount control system used for implementation of a power amount control method in accordance with this embodiment 1. In the drawing, reference numeral 1 is used to designate a server computer for use as a power amount control device which is connected to a network 4; numeral 2 denotes client computers of individual customers as connected to the network 4; and numeral 3 indicates a client computer of a power selling party (power dealer or others authorized to sell electric power), which computer is connected to the network 4. Preferred forms of this network 4 may include public communications links such as Internet, dedicated communications lines, or any combinations thereof.

Figure 2:
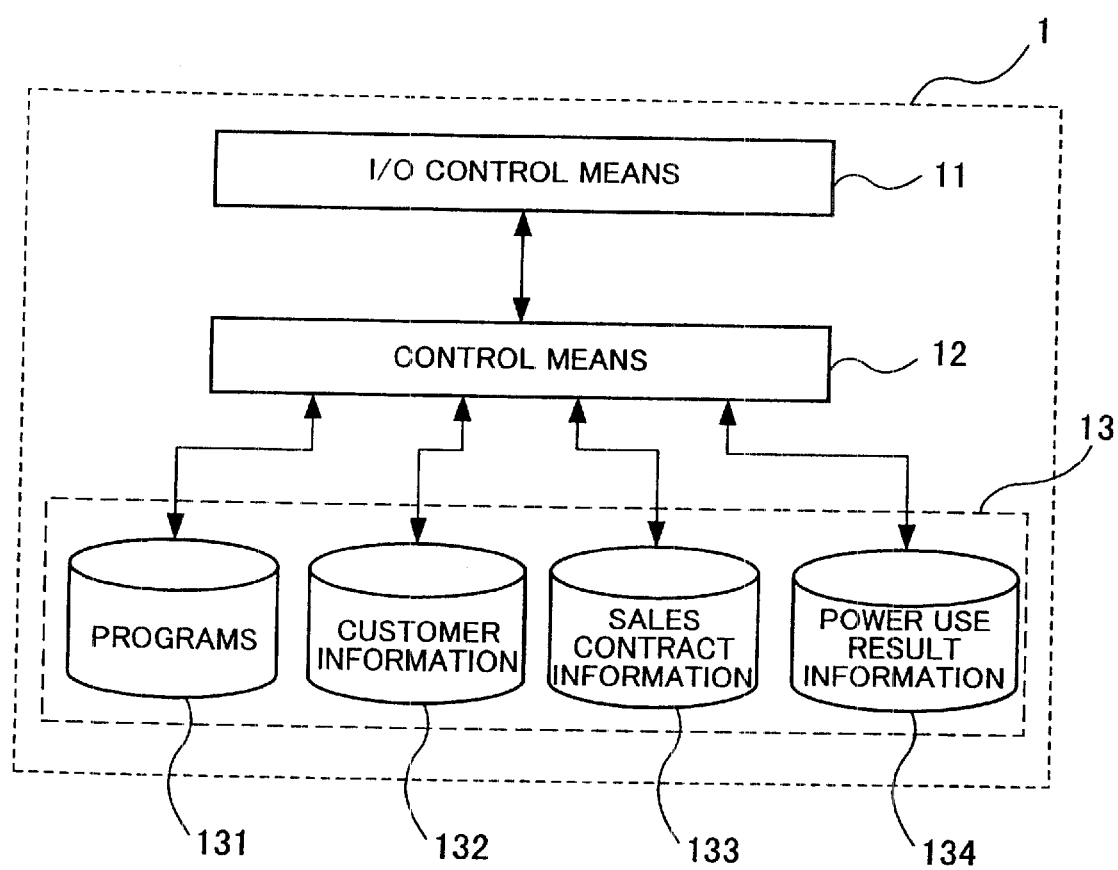
FIG. 2 is a block diagram showing a configuration of a server computer shown in FIG. 1.

FIG. 2 is a block diagram showing a configuration of the server computer 1 shown in FIG. 1. In this drawing, numeral 11 designates an input/output means for performing control of data being output to the client computers 2, 3 via the network 4 and data as input from the client computers 2, 3, wherein it functions to input a contracted power amount of the individual customer and the amount of the customer's actually consumed power and the like while outputting information as to a power amount difference between the contracted power amount and the consumed power amount (power amount difference per se or alternatively the contracted power amount and consumed power amount) for visual presentation to the customers via the network 4.

Numeral 12 designates a control means for selecting for execution a necessary program(s) along with required information (customer information 132, sales contract information 133 and power use result information 134) from a storage means 13 in a purpose-dependent way while at the same time controlling respective functional units. One example is that when computing a charge in a contract violation event, it calls for a (additionally collected) charge calculation program of a group of programs 131 and then calculates the charge by use of the sales contract information 133 and power use result information 134.

Numeral 13 is storage means for storing therein the program group 131 and respective kinds of information items 132–134, wherein the program group 131 includes a sales menu display creation program, sales contract information tabulation program, power feed assignment program and the like, for example. The respective kinds of information items stored include customer information 132, sales contract information 133, and power use result information 134.

Typical examples of this customer information 132 are information for identification of a customer and information concerning power utility equipment as owned by the customer. The customer identifying information includes but not limited to the name of the individual customer, his or her address or number for contact, and identification information for identifying the customer. The information as to the power utility equipment owned by the customer includes, inter alia, information on the purchase date of power utility equipment, manufacture time and loads, and information as to the model type of a demand control equipment, etc. installed.

FIG. 3 is a drawing showing the sales contract information 133 as stored in the storage means 13. As shown herein, the sales contract information 133 is the information as to the content of a sales contract, wherein this sales contract information 133 may include a customer name, sales contract term, designated power dealer, contract conditions, sales contract power amount, allowable variation amount, and the like.

The sale contract power amount consists of a power consumption pattern obtainable from each customer, which pattern is such that the amount of electrical power required at a certain time point was defined by contract. Examples of the consumed power pattern include, inter alia, the one that required power amounts are contracted in units of specified time intervals (e.g. in the form of 30 kW/h from 1 to 10 A.M. and 100 kW/h from 10 A.M. to 5 P.M.), the one that required power amounts are contracted in units of fixed time periods (e.g. in the form of a power amount contracted at every hour), or the one that a contracted power amount during a prespecified time duration is made continuous (e.g. in the form as represented either in a mathematical function fashion or in a graph form).

The allowable variation amount is a value which is set up for letting the contracted power amount have a marginal width, which is given as "±XX %" or "±XX kW," for example. Use of the sale contract power amount and the allowable variation amount in combination permits establishment of a power use contract for usage of electric power within a range defined by contract power amount ± allowable variation amount between an intervening party—namely an intermediary dealer or broker—and a customer.

The content of bonus processing is a contract concerning specific processing to be done when power amount is used within the allowable range; for example, there are "cash back if identical to the contracted power amount," "big discount upon the next contraction if the power amount used does not go out of the allowable range" or the like.

The content of contract breach processing is a contract relating to processing to be done when power amount consumed goes beyond the allowable range; for example, there are "power feed interruption in excessive use events," "cutting power feed down at XX % in excessive use events," "notice (necessary/unnecessary) when power is cut," "additionally collected charge payment ordered," etc.

These bonus processing content and contract breach processing content may be set up by the intermediary dealer or broker; alternatively, the customer of interest may select one of the bonus processing and contract breach processing upon establishment of his or her contract with the dealer. It should be noted that although in the illustrative embodiment the bonus processing content and contract breach processing content are independently set on a per-customer basis, the present invention should not exclusively be limited thereto and it may be modified so that a common bonus processing content and contract breach processing content are set up together for a plurality of customers.

Turning now to FIG. 4, there is shown the power use result information 134 being stored in the storage means 13 in FIG. 2. As shown in FIG. 4, the power use result information 134 contains therein a presently consumed power amount and a power use result up to a present time on a per-customer basis.

An explanation will next be given of an operation of the power amount control system shown in FIG. 1. See FIG. 5, which is a flow chart for explanation of a power amount control method in accordance with this embodiment 1. An explanation here assumes that a contract has been established for performing the contract breach processing in cases where a customer has used electric power amount in a way that it is out of the allowable variation amount—i.e. more than the contracted power amount or alternatively less than this amount—while permitting execution of the bonus processing in the event that the customer has used an appropriate amount of power falling within the allowable variation range.

First, visually display an input screen image for presentation to a customer via the network 4; then, let the customer input into this input display his or her preferred sales contract contents including the information as to the power pattern, allowable variation amount, bonus processing content, and contract breach processing content, thereby acquiring the sales contract information 133 (at step ST1). Note here that these information items thus acquired will be stored in the storage means 13 as the sales contract information 133.

In order to acquire the information as to the power pattern, let a power pattern input display such as shown in FIG. 6 be visually displayed for presentation to the customer, thus permitting the customer to use this input display to register his or her desired power pattern (power pattern of contracted power amount).

Figure 7:
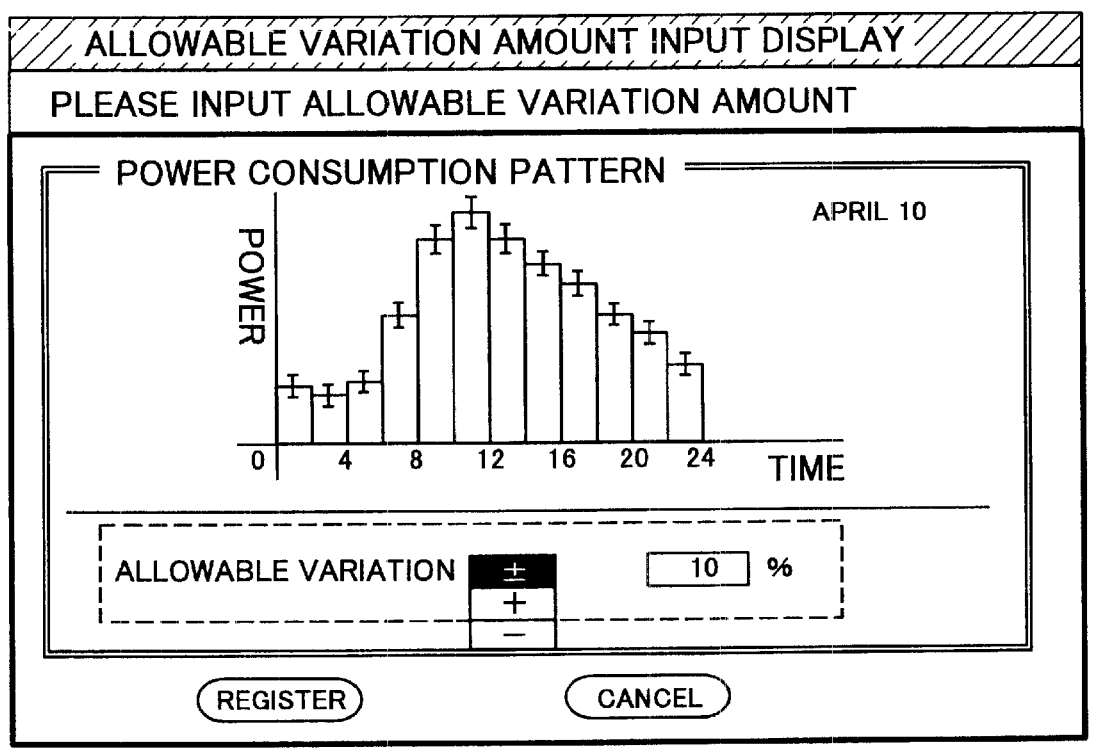
FIG. 7 is a diagram showing an allowable variation input display.

To obtain the allowable variation amount, display an allowable variation amount input display shown in FIG. 7 for presentation to the customer, permitting the customer to register using this input display his or her desired allowable amount. In FIG. 7, "+" represents an upper limit value; "−" refers to a lower limit value; "±" indicates upper/lower limit values. As shown in FIG. 7, a bar graph is employed to let the customer recognize the power pattern of the contracted power amount while enabling recognition of the allowable amount based on the range of a bar.

Additionally, although in FIGS. 6 and 7 the power pattern of the contracted power amount is given in the bar graph format, this invention should not be limited only to this format: it may be modified into other formats using curves or value indication schemes.

Figure 8:
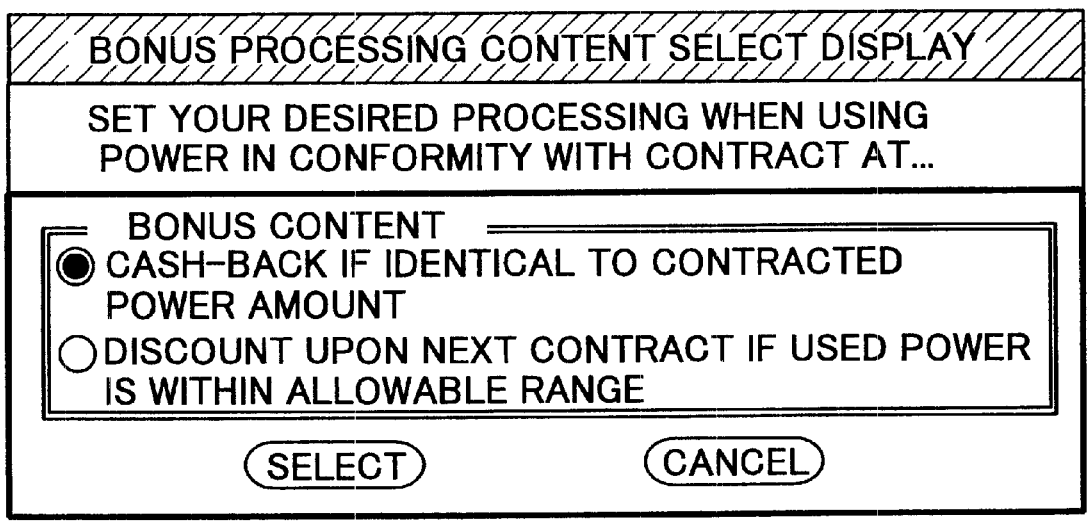
FIG. 8 is a diagram showing a bonus content select display.

Also note that when gaining the bonus processing content, let a bonus processing content selection display or such as shown in FIG. 8 be displayed for presentation to the customer, thus permitting the customer to input the content of his or her desired bonus processing by use of this input display.

To gain the contract breach processing content, let a contract breach processing selection display shown in FIG. 9 be displayed for presentation to the customer, permitting this customer to use this input display to input the content of his or her desired contract breach processing.

Although in the embodiment discussed herein the customer is capable of selecting each content, the above-stated input processing using these input displays will no longer be required in cases where each contract content is set up by the intermediary dealer or broker. Any other required information items are obtainable through visual presentation of an input display(s) in a way similar to that stated supra. Note that the aforesaid respective on-screen display images and the contents thereof should not be considered to limit the scope of the invention, which may be modified and altered into a variety of different forms.

Figure 5:
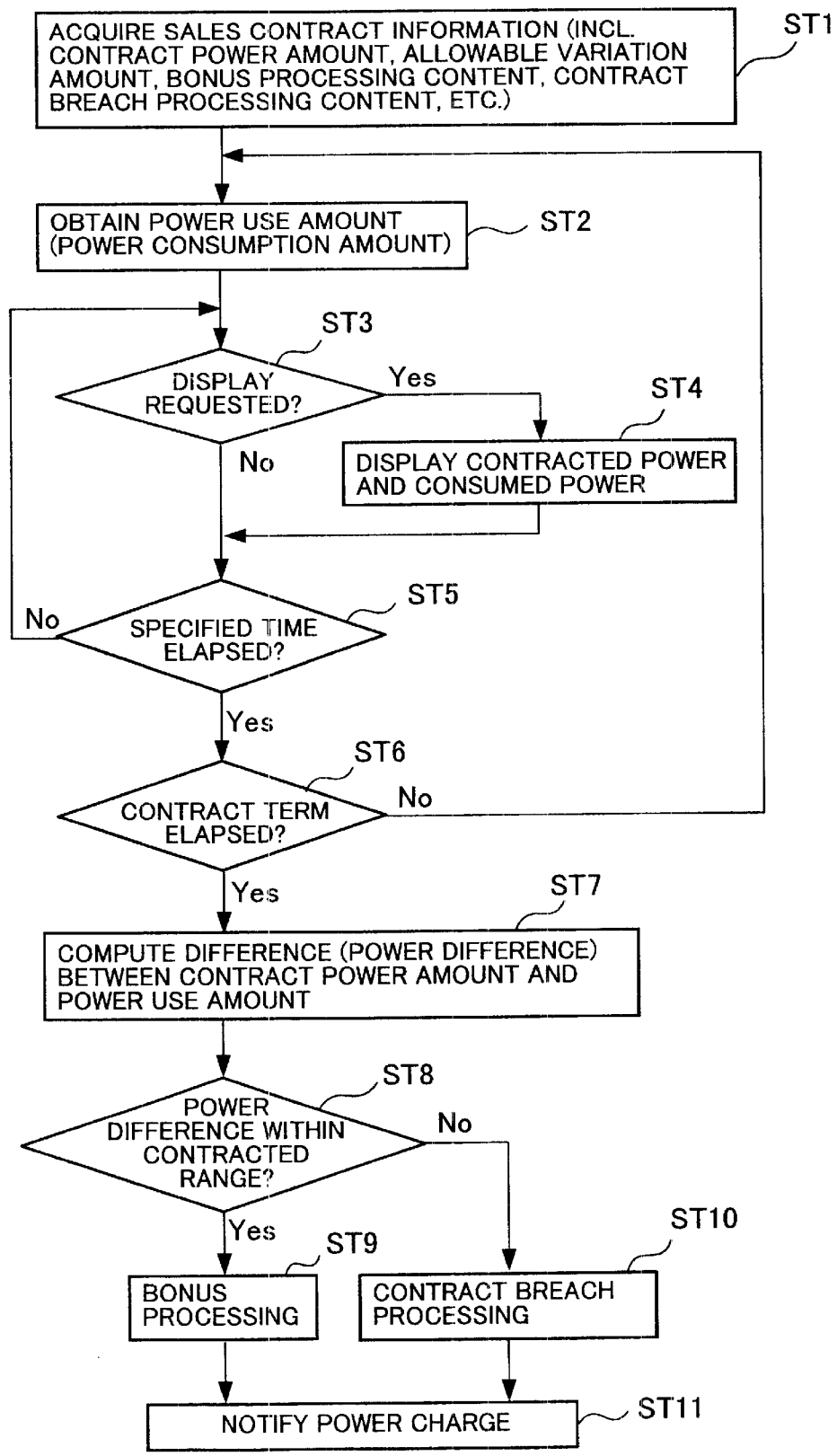
FIG. 5 is a flow chart for explanation of a power amount control method in accordance with the embodiment 1 of the invention.

After having acquired the sales contract information 133 in this way, obtain each customer's power consumption amount and then store it into the power use result information 134 of the storage means 13 (at step ST2 of FIG. 5). Note here that acquisition of the power consumption amount of each customer may be done by any methods if the customer's power consumption amount per specified time period is available, which methods include a method for counting up pulses coming from a power meter.

Here, confirm whether a request is issued from a customer for displaying the contract power amount and consumed power amount (at step ST3): if YES, then display via the network 4 the contract power amount and power consumption amount for presentation to the customer (at ST4); if NO then the system procedure goes next to step ST5. At ST5, determine or "judge" whether a prespecified length of time (time duration spanning from an instant for acquisition of the last power consumption amount to an instant whereat a new or updated power consumption amount will next be acquired) has been elapsed: if NO then the procedure goes back to step ST3; if YES then proceed to ST6.

Any necessary information items to be displayed are obtainable by a method having the steps of searching through sale contract search processing the sales contract information 133 on the basis of the customer information and then acquiring this customer's sale contract information.

Figure 10:
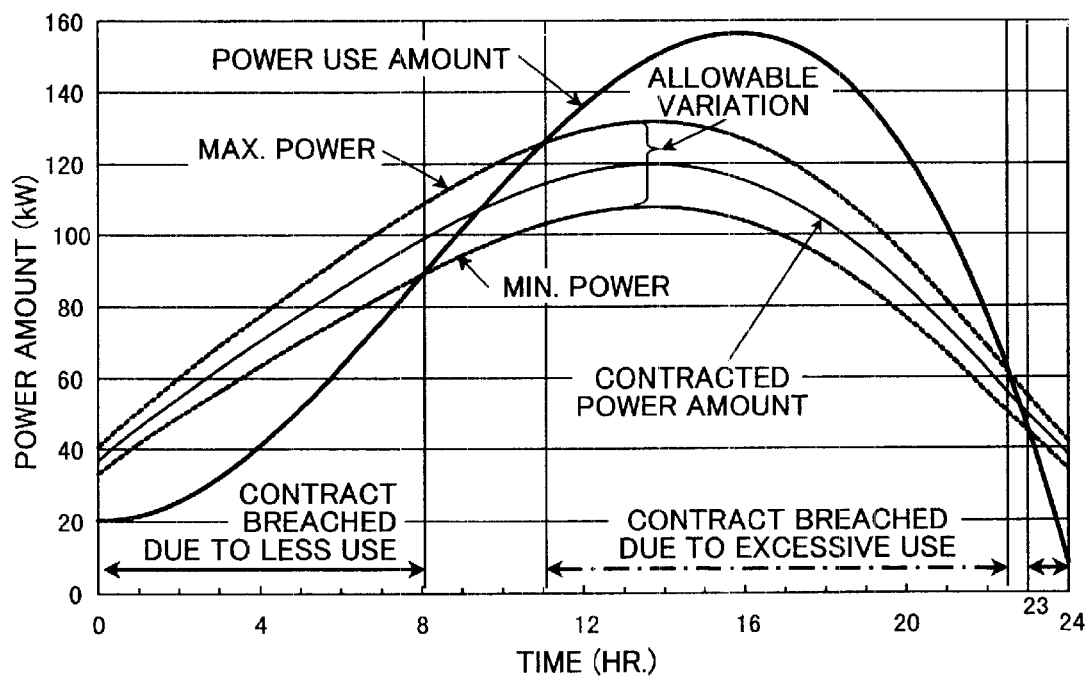
FIG. 10 is a diagram showing the content of a visual display for presentation to a customer(s).

FIG. 10 is a diagram showing the content of an on-screen visual display as presented to the customer via the network. As shown herein, the contract power amount and power use amount (power consumption amount) plus allowable variation amount are displayed as the information concerning a power amount difference. Displaying the contract power amount and power consumption amount plus allowable variation amount together in this way makes it possible for more than one customer to readily check or verify whether his or her actually consumed power amount (up to a present time) stays within the allowable range of the contracted power amount.

It should be noted that although in FIG. 10 each power amount is indicated by a continuous value, the same goes with a bar graph as given in the form of an accumulated value at a specified time, such as in units of 30-minute intervals or 1-hour intervals, which is selectable depending on the form of the contract actually exchanged. Also note that although in FIG. 10 the allowable variation amount is expressed in the form of "±10%" (let a power amount of +10% be the maximum power amount whereas a power amount of −10% is as the minimum power amount), the allowable variation amount is a value as has been defined by the contract on a case-by-case basis.

As shown in FIG. 10, power consumption amounts measured in time periods of 0 to 8 A.M. and 11 P.M. to 0 A.M. stay below the minimum power amount; thus, such power usage is deemed to breach the contract. On the contrary, a power consumption amount within a period of from 11 A.M. to 10:30 P.M. is in excess of the maximum power amount. This is also deemed to breach the contract. In the remaining time zones, resultant power consumption amounts are more than or equal to the minimum power amount and yet less than or equal to the maximum power amount; thus, these fall within the contracted range.

At step ST6 of FIG. 5, check or verify whether the contract period or term has been elapsed: if NO then the routine returns to step ST2; if YES then go to ST7.

Upon termination of the contract term, the contracted power amount and power consumption amount as have been acquired at steps ST1 and ST2 are read out of the storage means 13; then, calculate the absolute value of a difference between them (power amount difference) whenever a specified time has elapsed (at step ST7). Letting the absolute value of such difference be the power amount difference enables judgment as to whether the amount of a presently consumed power amount goes beyond the level as defined by "contract power amount+allowable range" while at the same time enabling determination as to whether the consumed power amount is below the level defined by "contract power amount−allowable range."

Then, determine whether the power amount difference thus obtained falls within the range of the allowable variation amount as included in the contract information (at step ST8). Here, if YES then the system routine proceeds to step ST9; if NO then go to ST10.

If at step ST8 the power amount difference is within the allowable range, that is, if the customer uses power within the allowable range, then certain processing as defined in the bonus processing content is carried out (at step ST9). In brief, the bonus processing as has been contracted in advance with the customer is performed. The term "bonus processing" as used herein may refer to processing for setting a lower price than the initially determined price by the contract or alternatively setting lower or "discounting" the price to be next contracted, by way of example.

On the other hand, if the power amount difference is out of the allowable range then execute the processing as defined in the contract breach processing content (at step ST10). In other words, the contract breach processing as has been contracted in advance with the customer is carried out. The term "contract breach processing" is to be understood to mean an action or measure against violation of the contract, including for example interruption of power feed, ordering payment of an extra charge as a penalty, also known as the additionally collected charge, or other similar suitable activities.

After completion of the processing at step ST9 or ST10, a final power amount charge is notified via the network 4 to the customer concerned (at step ST11).

Although this embodiment is illustratively designed to perform both the bonus processing and the contract breach processing, the invention should not be limited only to such scheme. Optionally either the bonus processing or the contract breach processing may be done solely when the need arises.

In this embodiment it is possible for the individual customer to obtain over the network in online fashion his or her required information items concerning the power usage including but not limited to a past or present power consumption amount along with its accumulated value and further a power amount charge at any time whenever s/he wants to do so; thus it becomes possible to readily confirm whether s/he is using electric power amount in conformity with the contract being presently established. Furthermore, in view of the fact that the embodiment is arranged to perform the bonus processing in cases where a power amount difference between a presently consumed power amount and the initially contracted power amount stays within the range of allowable variation amount and, adversely, execute the contract breach processing such as ordering to pay an extra charge or additionally collected charge in case the power amount difference goes beyond the allowable variation amount, the customer attempts to take an adequate action for facilitating execution of the bonus processing or alternatively for avoiding execution of the contract breach processing through his or her own activity to reflect this result on either the control of target equipment or the content of a contract to be next exchanged, which results in a decrease in number of events that the contracted power amount significantly goes beyond or drops down from an appropriate level. This in turn makes it possible to achieve appropriate power amount control, thus enabling preclusion of any possible overuse and/or shortage of a great amount of electric power. Thus it is possible to facilitate establishment of a well balanced power demand and supply relation, thereby enabling reduction of necessary expenditures for power furnishing and for guarantee against emergency.

Embodiment 2.

This embodiment 2 is arranged so that in accordance with a customer's contracted power amount and his or her consumed power amount, this customer makes a decision as to whether installation of a power amount controlling system is necessary or not: if judged to be necessary then a suggestion for installing the power amount control system is provided to the customer.

Figure 11:
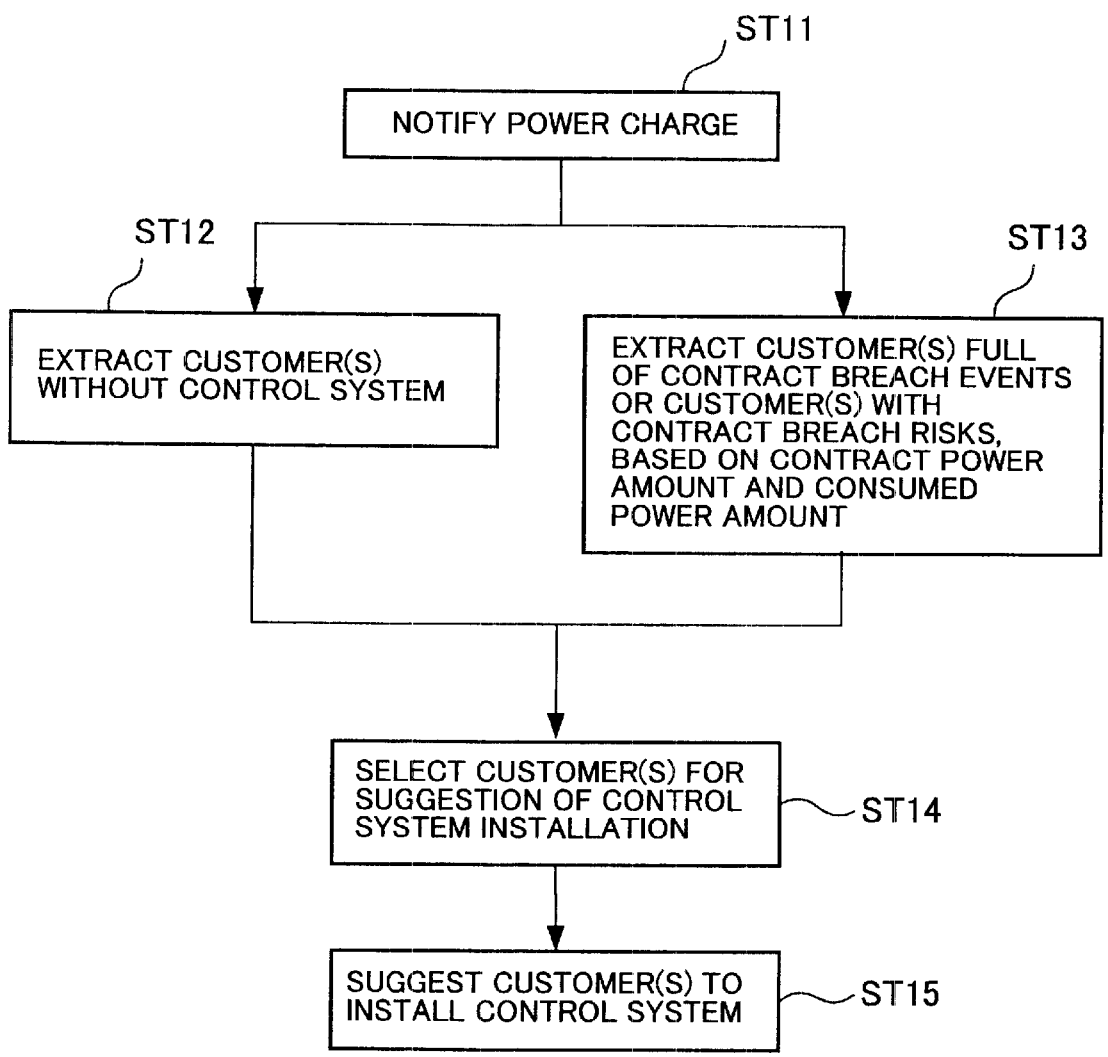
FIG. 11 is a flow chart for explanation of a power amount control method in accordance with an embodiment 2 of the invention.

The power amount control system of this embodiment 2 is almost similar to that shown in FIG. 1; thus, a repetitive explanation is omitted herein. FIG. 11 is a diagram showing a flow chart showing a power amount control method of this embodiment 2. Note that steps ST11 of FIG. 11 corresponds to ST11 of FIG. 5.

First, a search is made to find from the customer information 132 more than one customer who does not own any power amount control system (at step ST12). Here, the power amount control system as used herein is understood to mean a system for prediction of a power amount required, a system for comparing a with-time change in the amount of presently used electric power with an initially established power usage plan (referred to as prediction system hereinafter), or demand control equipment or the like.

Examples of the prediction system include, inter alia, the one that is operable to predict the amount of required power from certain factors such as seasons, week days, time points, etc. and a contract versus use result correlation in the past, the one that comparatively displays a change with time of the amount of power being presently used and the initially established power use plan at the time of contraction to thereby enable monitoring for verification of whether electric power is being used according to the plan, and the one that inputs information as to the load of target equipment to be controlled and then presents a customer(s) with an advice or suggestion about what degree of power amount can be reduced upon interruption of the presently operating to-be-controlled equipment, wherein any one of these systems is employable on a case-by-case basis.

One typical example of the demand control equipment is the one that calculates excess power amount based on the contracted power amount and the amount of power being presently used and then performs interruption or startup of the to-be-controlled equipment in deference to the calculation result, in a way as taught by Japanese Laid-Open Patent Publications 274394/1995 and 143670/1995.

On the other hand, search is made based on both the contracted power amount stored in the sales contract information 133 and the consumed power amount in the power use result information 134 to find out a specific customer who has breached the contract many times in the past—i.e. power amount differences are often out of the allowable range—or a customer who is supposed to breach the contract in near future (at step ST13).

Extract more than one common customer from among those customers as searched at steps ST12 and ST13; then,
let it be as the target customer who should install a power amount control system (at step ST14). Note here that although such customer to be extracted may typically be the common customer, others may also be extracted including a customer who has already owned a power amount control system.

Figure 12:
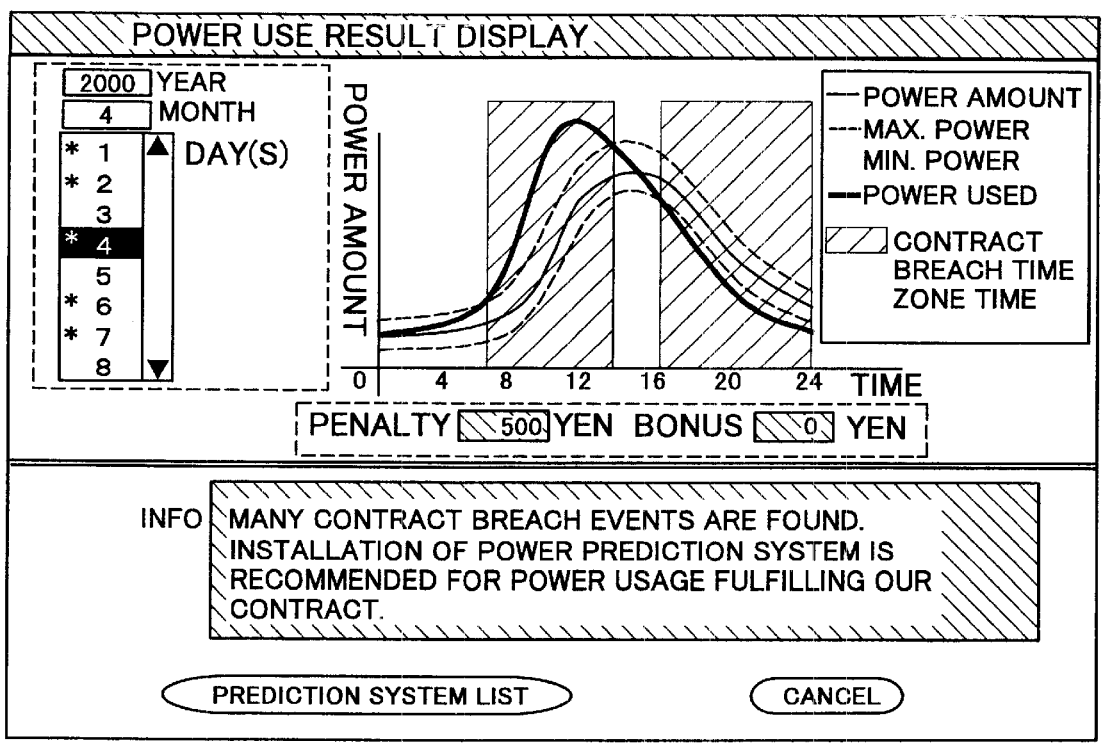
FIG. 12 is a diagram showing a visual display for suggestion of installation of a prediction system.
Figure 13:
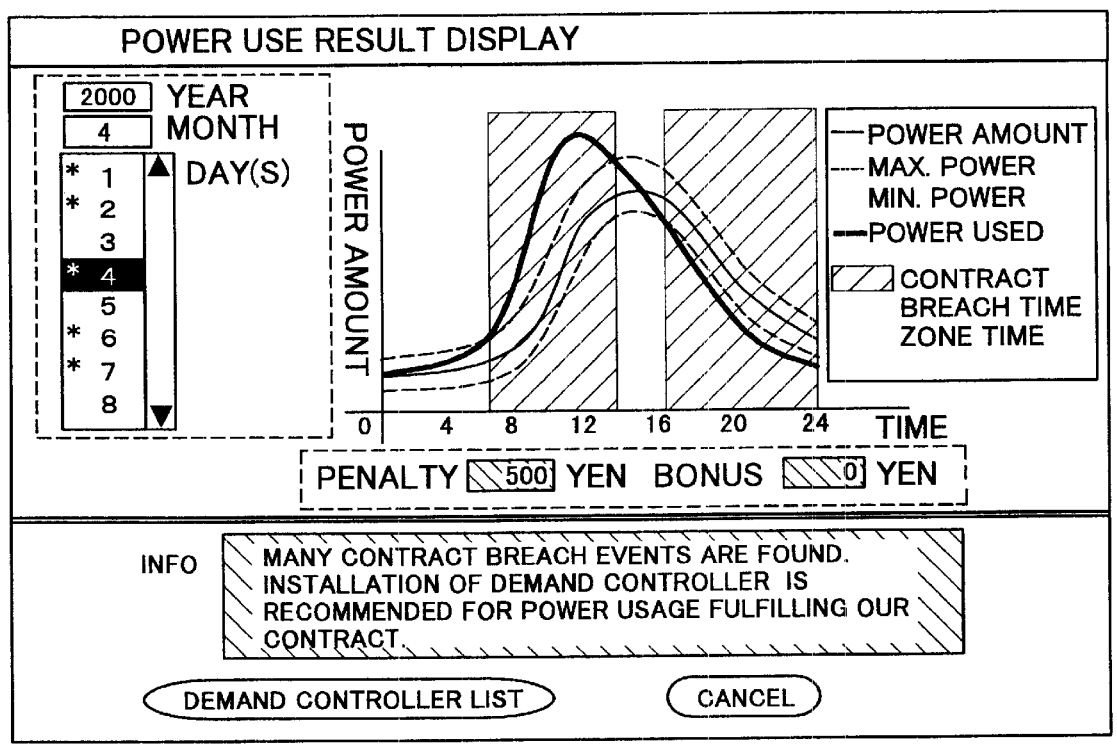
FIG. 13 is a diagram showing a display for suggesting installation of demand control equipment.

For the customer extracted in this way, installation of either a prediction system or demand control equipment is proposed by displaying via the network 4 an on-screen graphics image such as shown in FIG. 12 or 13 or by utilization of E-mails (at step ST15). Optionally an intermediary dealer or broker may suggest the customer to install such prediction system or demand control equipment by using a method for permitting the broker rather than the power dealer per se to implement power charge discount for the customer who has already installed a prediction system or demand control equipment with or without offering a burden to pay part of the expense for installation of the prediction system or demand control equipment.

With the power amount control method of this embodiment, whether the power amount control system installation is necessary or not with respect to this customer is judged in accordance with both the customer's contracted power amount and power consumption amount and then installation of a power amount control system is suggested to the customer when this is decided to be necessary; thus, it is possible to let the customer who requires a power amount control system install such power amount control system, which in turn makes it possible to implement more accurate power supply prediction due to the customer's activity to own the power amount control system and/or implement an adequate countermeasure for power usage due to the customer's acknowledgement about his or her power use condition or status. As a result, it is possible to make smaller a difference between the contracted power amount and the power use amount.

In addition, utilization of network links also makes it possible for the intermediary dealer or broker to promptly notify more than one customer of the necessity for installation of the power amount control system at any time when the prediction system installation is judged necessary. Further, it is possible to build up an automatic notification scheme using E-mails. Accordingly the broker's troublesome and time-consuming works can be eliminated or at least greatly reduced.

In addition, since it is possible for a customer who has received a notice to reconsider installation of a power amount control system while taking account of cost-to-effect factors, the customer will no longer feel that s/he is forced by the dealer to do so.

Additionally, in case the customer per se owns his or her demand control equipment, it is possible for the intermediary dealer to monitor the target customer's power use amount and/or power loads of the to-be-controlled equipment over network links on a real time basis; thus it becomes possible to avoid any possible significant deviation of his or her power use amount from the initially contracted power amount.

Embodiment 3.

This embodiment 3 is arranged so that in cases where installation of a power amount control system for a customer is judged to be necessary, it permits an intermediary dealer or broker to provide consultation to the customer as to whether such power amount control system installation is necessary and also which type of power amount control system should be installed.

Figure 14:
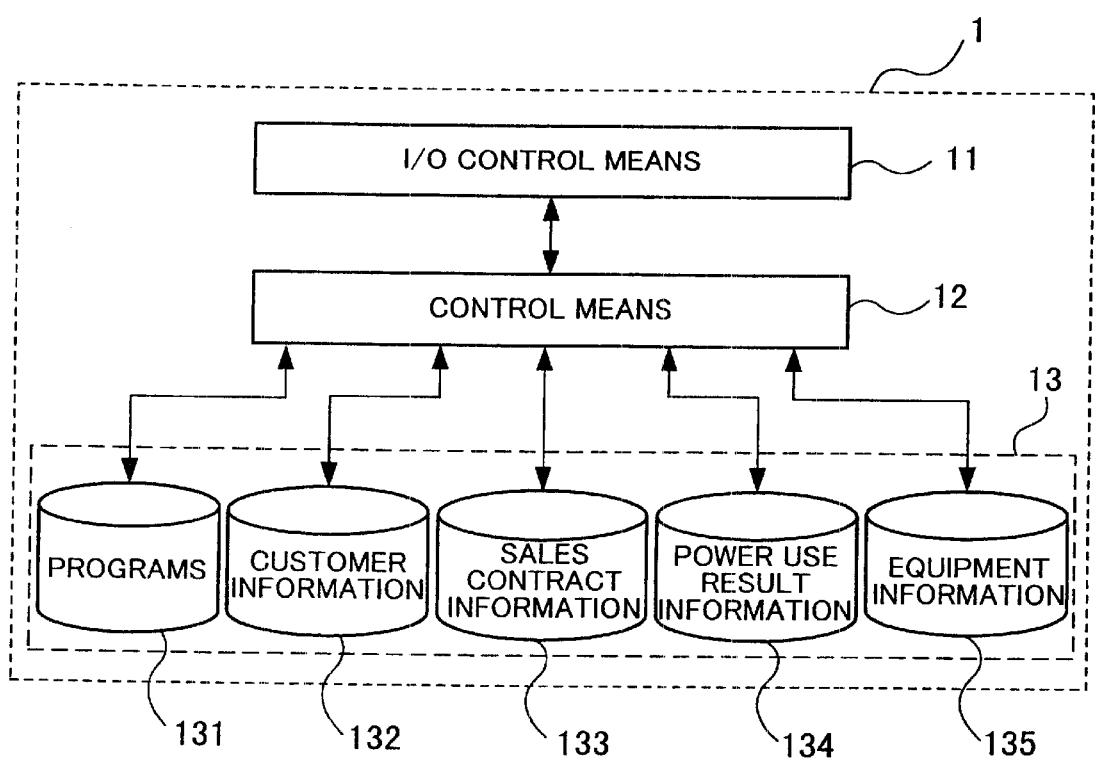
FIG. 14 is a block diagram showing a configuration of a power amount control apparatus in accordance with an embodiment 3 of the invention.

FIG. 14 is a block diagram showing a configuration of an electric power amount control system of this embodiment 3.

In this drawing, numeral 135 designates equipment information being stored in the storage means 13, which also stores therein information items concerning specifications and characteristics of any available prediction systems and demand controllers, including but not limited to information to be presented to customers in prediction systems, schemes for prediction of a required power amount, control methods at demand controllers, and ranges customizable by customers. The others are the same as those of FIG. 2; thus, an explanation thereof is omitted. The power amount control system shown herein is similar to that shown in FIG. 1 except that the power amount control apparatus alone is different in the points stated above.

Figure 15:
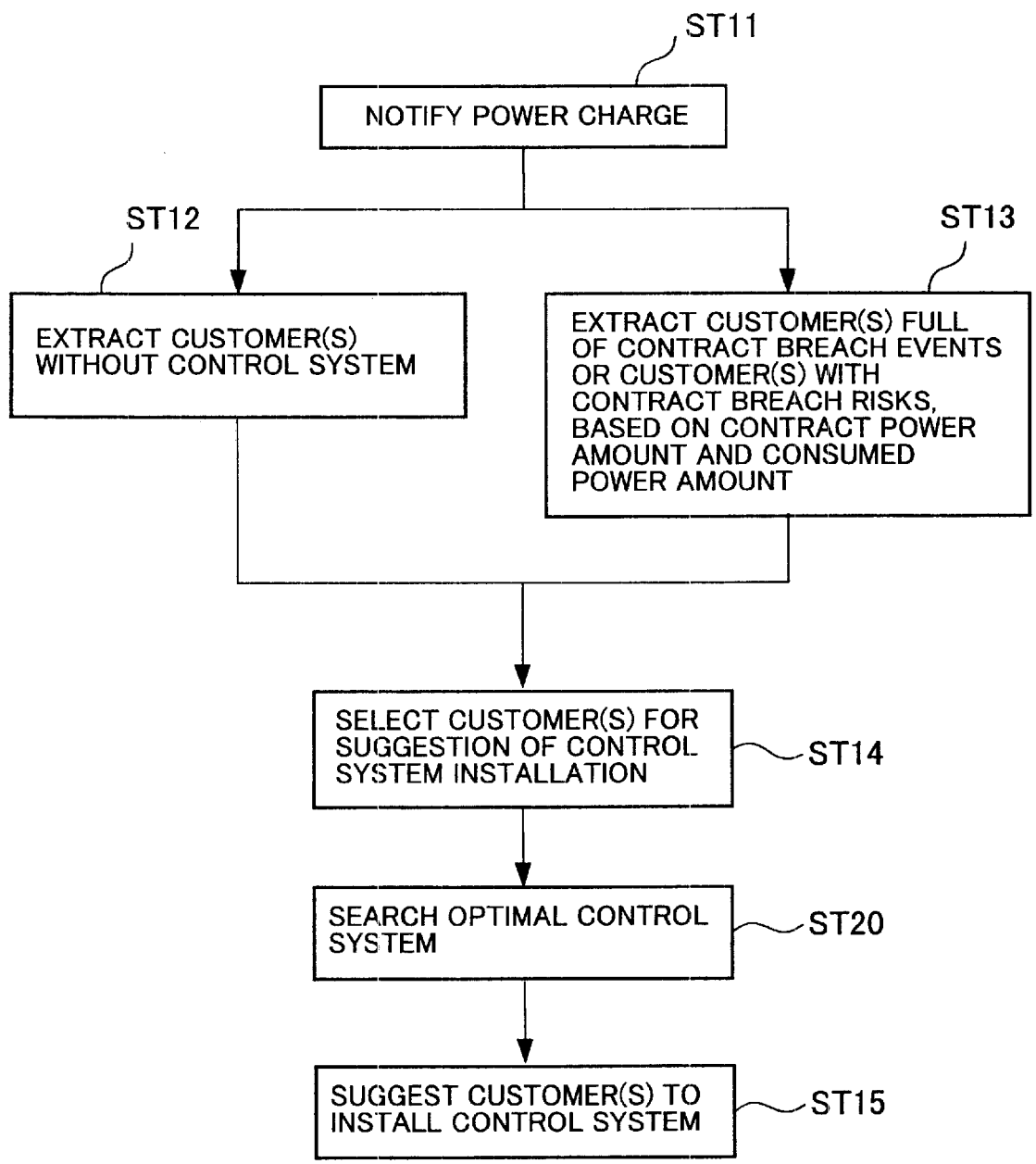
FIG. 15 is a flow chart for explanation of a power amount control method in accordance with the embodiment 3 of the invention.

An explanation will next be given of a power amount control method of this embodiment 3. FIG. 15 is a flow chart for explanation of the power amount control method of this embodiment 3. Note that steps ST11 to ST15 of FIG. 15 are the same as corresponding steps ST11–ST15 of FIG. 11, and an explanation thereof is eliminated herein.

At step ST20, search is made based on the power use result information 134 being presently stored in the storage means 13 to determine an optimal power amount control system for the customer of interest such as a prediction system, demand control equipment or else. And, at next step ST14, installation of this optimal power amount control system is suggested. The customer may decide his or her preferred optimal one while letting a search be done for a single optimal power amount control system for proposition or alternatively making a list of a plurality of candidates for proposition of their characteristics and effects to the customer.

Figure 16:
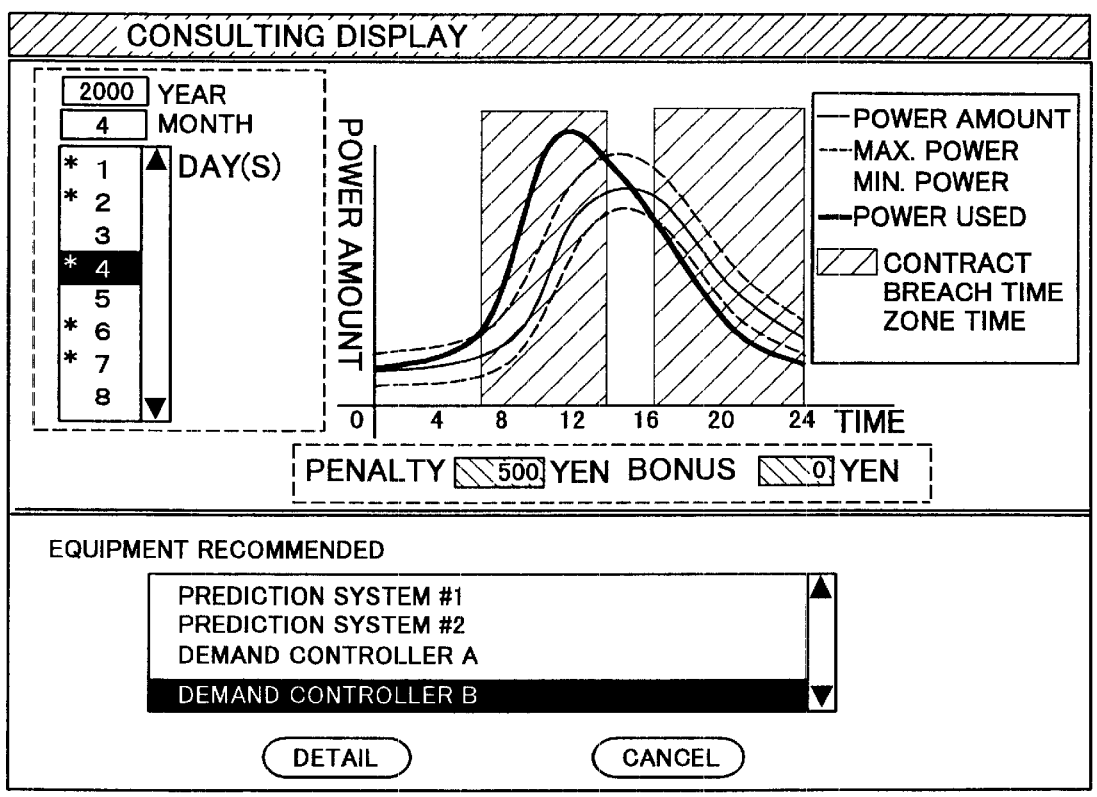
FIG. 16 is a diagram showing a consulting display.

At this time, an intermediary dealer further provides consultation while displaying via network links an on-screen image such as shown in FIG. 16 for presentation to the customer, thereby offering to the customer who has installed the optimal power amount control system additional services including implementation of power charge discount or the like.

With the power amount control method in accordance with this embodiment, upon installation of a power amount control system, the intermediary dealer is expected to provide consultation in such a way as to permit best possible selection of optimal power amount control systems for customers concerned. Upon receipt of such consultation, the individual customer is capable of becoming aware of the necessity for power amount control system installation and/ or whether such power amount control system and his or her presently owned power amount control system are suitable or not.

In addition, it is possible for the intermediary dealer to lessen or minimize differences between the customer's contracted power amount and the actual power consumption amount because of the fact that execution of an optimal countermeasure(s) can be done through the dealer's consultation with a customer who does not yet own any power amount control system or a customer who has breached the contract many times due to the lack of the suitability of his or her presently owned power amount control system.

Embodiment 4.

This embodiment 4 relates to a power amount control method which is arranged to predict power consumption amounts of customers concerned, combine together a first customer whose consumed power amount was predicted to go beyond his or her contracted power amount and a second customer whose consumed power amount was predicted to stay below his or her contracted power amount, and then retroactively modify—namely, effectuate an "ex post facto" amendment of—the initially contracted power amount in such a way as to send to the first customer the electric power as has been contracted to be sent toward the second customer at the time of contraction.

Figure 17:
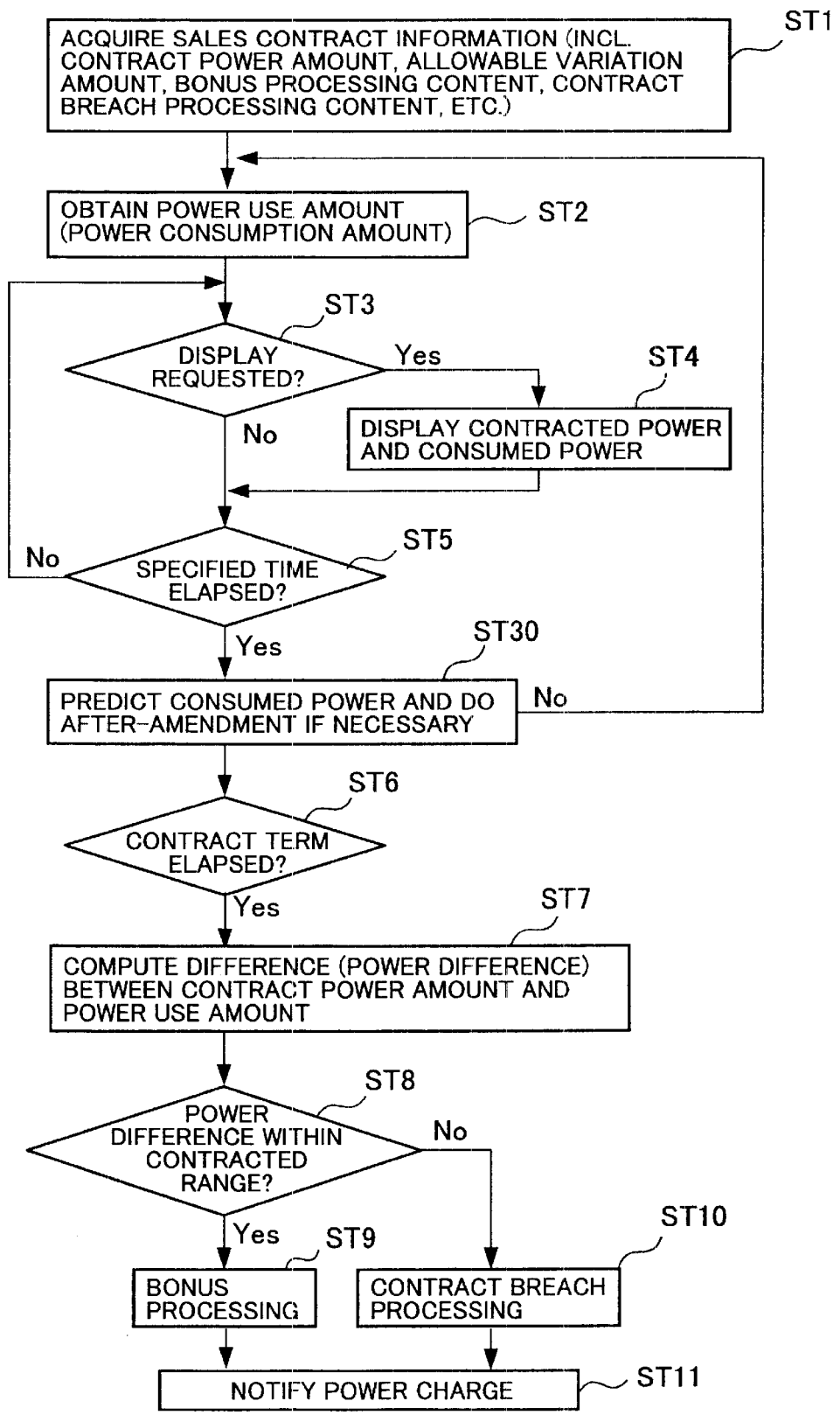
FIG. 17 is a flow chart for explanation of a power amount control method in accordance with an embodiment 4 of the invention.

As a power amount control system employed for implementation of the power amount control method of this embodiment 4 is substantially the same as that of the embodiment 1, an explanation thereof is omitted. Next, an operation will be set forth below. FIG. 17 is a flow chart for explanation of the power amount control method of this embodiment 4. Note that steps ST1 to ST11 of FIG. 17 are the same as those ST1 to ST11 of FIG. 5, and an explanation thereof is omitted herein.

At step ST30, predict customers' power consumption amounts; combine together a customer whose consumed power amount was predicted to exceed his or her contracted power amount and another customer whose consumed power amount was predicted to stay below his or her contracted power amount; then perform an ex post facto amendment or revision of the initially contracted power amount in such a way as to send to the customer whose consumed power amount was predicted to exceed his or her contracted power amount the electric power as has been contracted to be sent toward the customer whose consumed power amount was predicted to stay below his or her contracted power amount at the contract exchange time, thereby letting these customers' contract power amounts be amended or updated retroactively.

Figure 18:
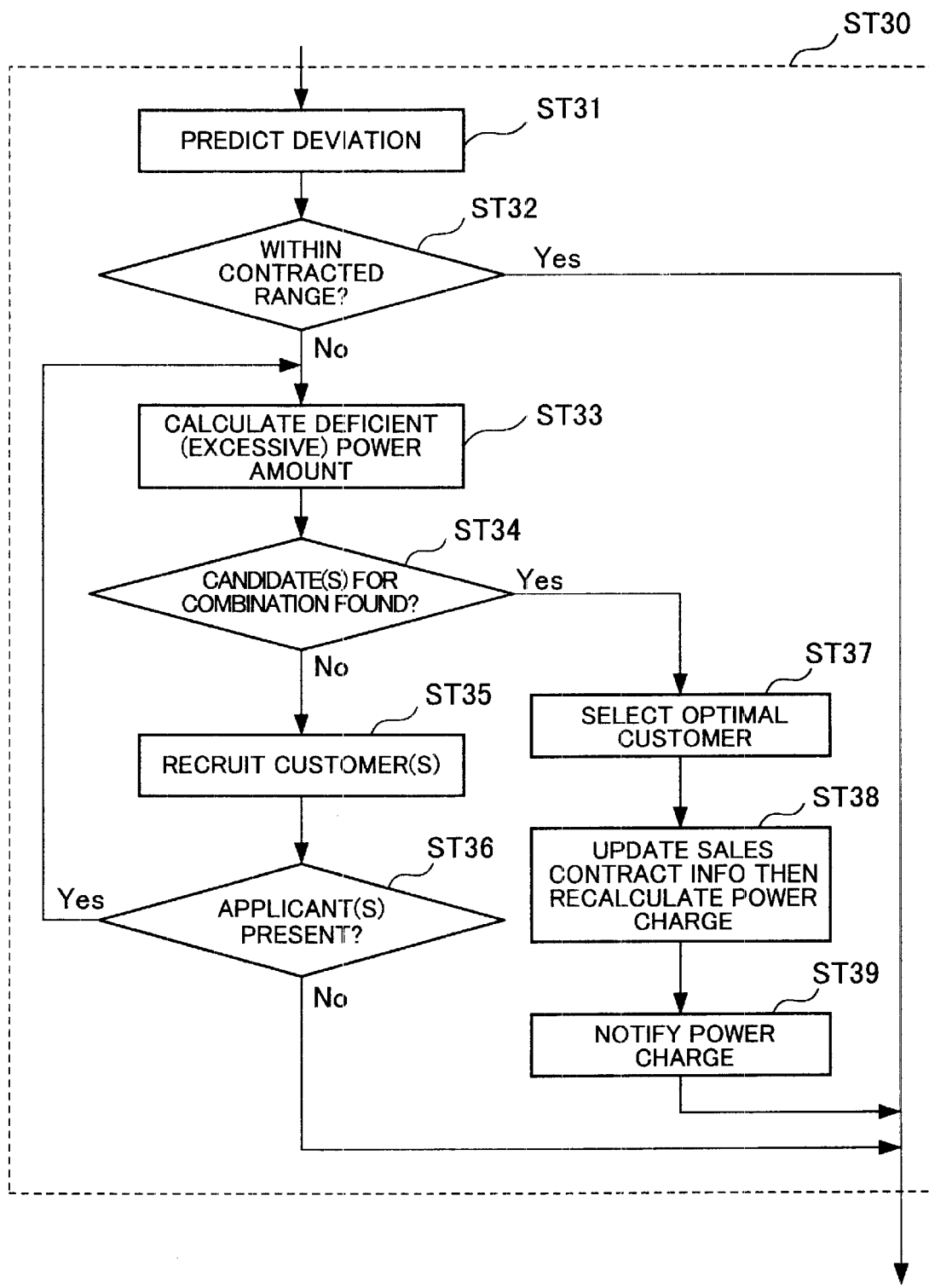
FIG. 18 is a flowchart for explanation of an operation of ST30 shown in FIG. 17.

FIG. 18 is a flowchart for detailed explanation of an operation of ST30 shown in FIG. 17.

First, let prediction be done of a variation of the amount of after consumed power (value of power consumption amount) by use of the prediction system such as shown in the embodiment 2 for example (at step ST31); then, compare this predicted variation amount with a presently established allowable variation amount to thereby confirm whether a variation from the contracted power amount falls within the contracted range (ST32). If YES then the system procedure returns to ST6 of FIG. 17, if NO then go to ST33.

At step ST33, each customer's deficient power amount or excessive power amount is calculated. More specifically, if the power consumption amount thus predicted is less than the contracted power amount then calculate as the deficient power amount a value of "contracted power amount— predicted power consumption amount"; alternatively, if the former is more than the latter then compute as the excessive power amount a value of "predicted power consumption amount—contracted power amount."

For the deficient (excessive) power amount thus calculated, search is made to determine whether there is a candidate suitable for combination (ST34). This candidate search may be achieved in a way such that a specific one with approximation in excessive (deficient) power amount is searched with respect to the deficient (excessive) power amount of a certain customer (e.g. higher priority is given to a customer who has requested amendment of his or her contracted power amount, in particular, a customer whose deficient or excessive power amount is more significant than others). Note here that the nearer the value, the better the result; for example, processing may be done for cutting off less than 10 KW. Optionally the combination stated supra should not be limited only to one-to-one combination, and other possible combinations are also employable, such as one-to-many or many-to-many schemes.

In case no combinable customers are present at ST34, newly increase through public subscription the number of customers whose power amounts are on the shortage side or excess side or the both (ST35): if more than one applicant or subscriber is present then perform the processing of ST33, ST34 discussed above; adversely, if no such applicants are found then return to ST6 of FIG. 17.

Figure 19:
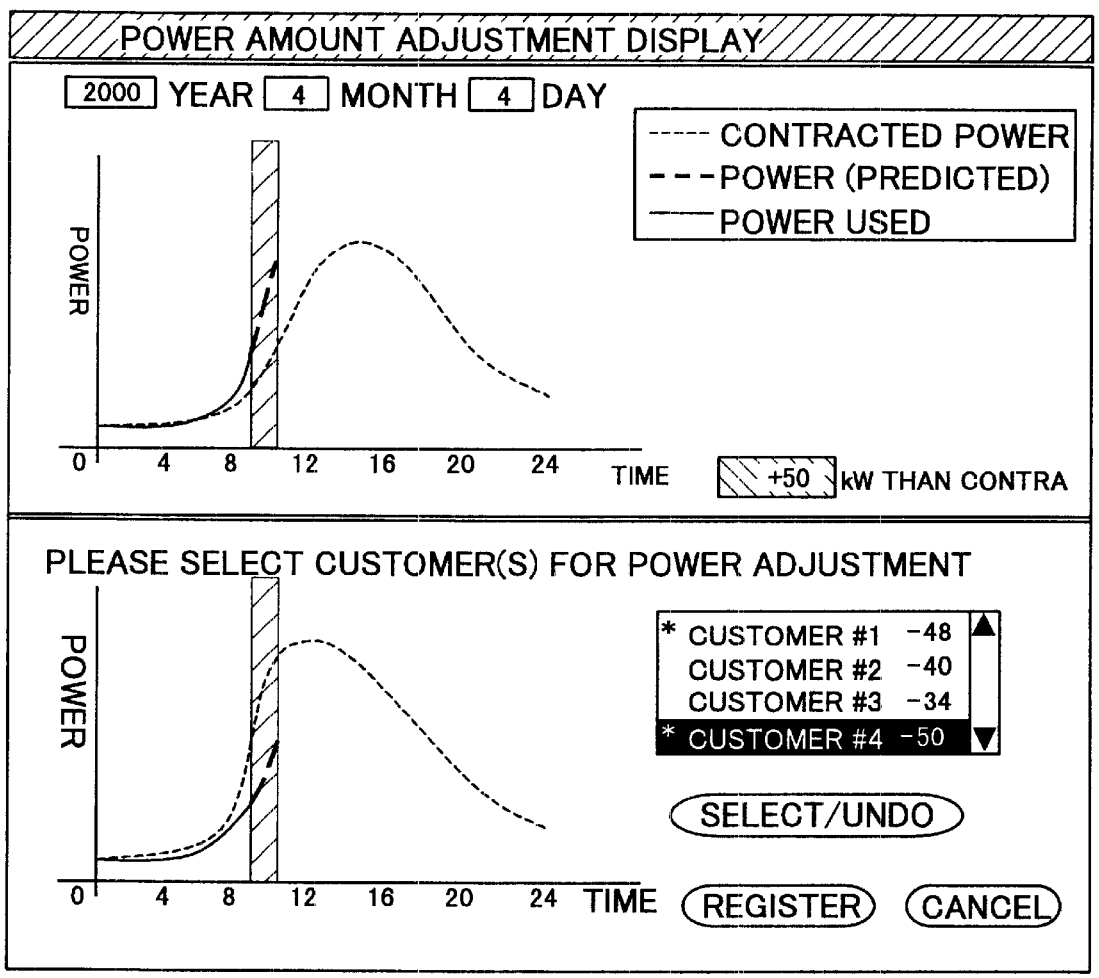
FIG. 19 is a diagram showing a power amount adjustment display.
Figure 20:
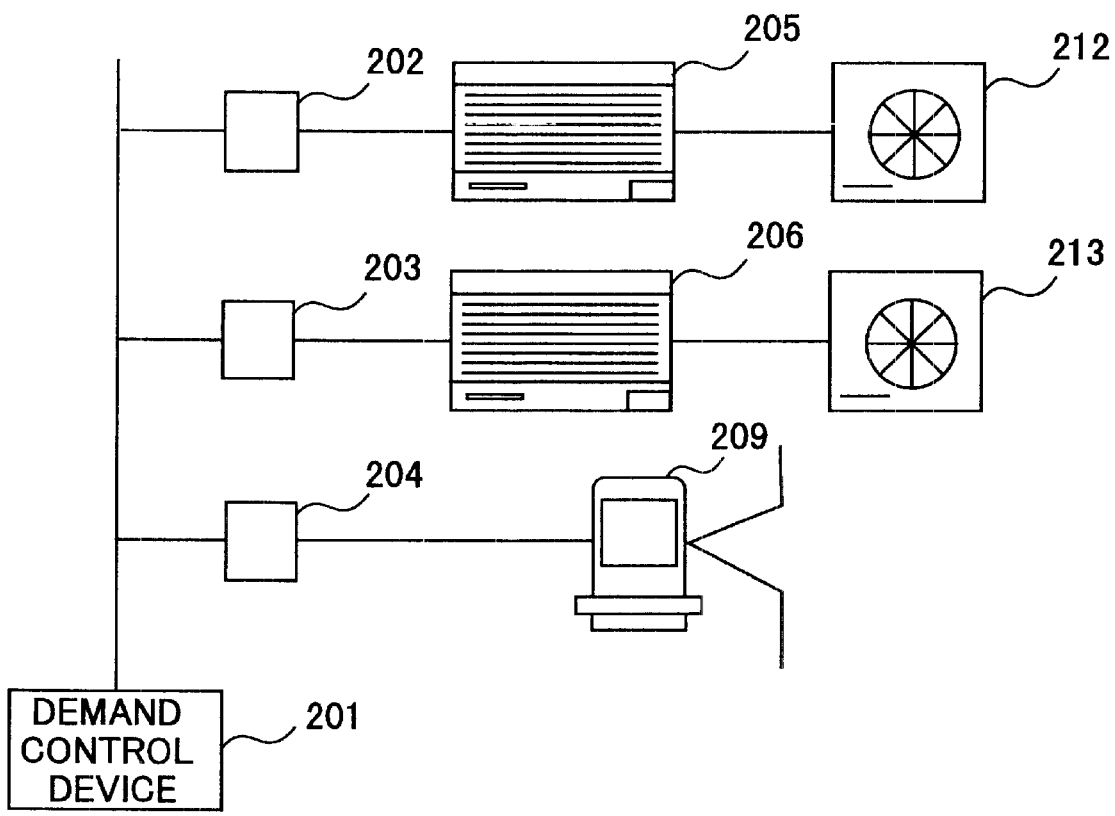
FIG. 20 is a diagram showing one prior art power amount control apparatus.

In case the combinable customers are found at ST34, an intermediary dealer or broker selects more than one optimal customer for the intended combination on the basis of a visual display shown in FIG. 19. In other words if a plurality of such appropriate customers are present then the optimal customer(s) will be selected from among them. Additionally if only one customer is present then s/he will be selected as such optimal customer.

After having combined appropriate customers together in this way, amendment or revision of the sales contract information 133 (such as updating of the contracted power amount or the like) as required due to such combination is carried out; let re-calculation of a power charge be executed (ST38); and then, notify this result to the customer(s) and dealer(s) (ST39).

With this embodiment, the customer's power consumption amount is predicted and, if it exceeds the contracted power amount then combine together the first customer whose consumed power amount is predicted to go beyond his or her contracted power amount and the second customer whose consumed power amount is predicted to stay below his or her contracted power amount, and then perform an ex post facto amendment or revision of the initially contracted power amount in such a way as to send to the first customer the electric power as has been contracted to be sent toward the second customer at the time of contraction; thus it becomes possible to increase in number those customers who can use electric power amount correctly in a way conformity with their exchanged contracts while at the same time enabling the intermediary dealer or broker to offer this as the contract's additive value.

What is claimed is:

1. A power amount control method comprising:

inputting and storing a contracted power amount and an actually consumed power amount for each of a plurality of customers;

displaying, via a network, a power amount difference between the contracted power amount and the consumed power amount;

predicting the consumed power amounts of each of the customers;

combining together a first customer whose consumed power amount is predicted to exceed the contracted power amount and a second customer whose consumed power amount is predicted to be below the contracted power amount;

retroactively modifying the contracted power amount to be sent to the first customer to include the difference between the consumed power amount predicted for the second customer and the contracted power amount of the second customer; and executing one of a price establishment for the contracted power amount and a contract breach process accordance with the power amount difference.

* * * * *